US008473003B2

(12) United States Patent
Jung et al.

(10) Patent No.: US 8,473,003 B2
(45) Date of Patent: Jun. 25, 2013

(54) METHOD AND APPARATUS FOR RECEIVING SHORT MESSAGE SERVICE (SMS) IN DUAL MODE TERMINAL

(75) Inventors: Juno Jung, Gwangmyeong-si (KR); Jungha Lee, Seoul (KR); Seungmin Jeong, Anyang-si (KR); Bosoo Kim, Seoul (KR); Jungok Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 13/082,105

(22) Filed: Apr. 7, 2011

(65) Prior Publication Data

US 2012/0021782 A1 Jan. 26, 2012

Related U.S. Application Data

(60) Provisional application No. 61/367,458, filed on Jul. 26, 2010.

(30) Foreign Application Priority Data

Oct. 29, 2010 (KR) ........................ 10-2010-0106822

(51) Int. Cl.
*H04M 1/00* (2006.01)
*H04W 4/00* (2009.01)
*H04J 3/06* (2006.01)

(52) U.S. Cl.
USPC ............... 455/553.1; 455/452.1; 455/466; 370/350

(58) Field of Classification Search
USPC ............ 455/466, 552.1, 553.1; 370/330, 370/350
See application file for complete search history.

(56) References Cited

U.S. PATENT DOCUMENTS

| | | | | |
|---|---|---|---|---|
| 5,699,388 | A * | 12/1997 | Wang et al. | 375/356 |
| 6,014,548 | A * | 1/2000 | Balachandran et al. | 455/13.2 |
| 7,965,979 | B2 * | 6/2011 | Waxman | 455/11.1 |
| 8,274,947 | B1 * | 9/2012 | Fang et al. | 370/331 |
| 2002/0141452 | A1 * | 10/2002 | Mauritz et al. | 370/503 |
| 2005/0232384 | A1 * | 10/2005 | Heid et al. | 375/354 |
| 2007/0058591 | A1 * | 3/2007 | Lamance et al. | 370/335 |
| 2007/0116058 | A1 * | 5/2007 | Rausch et al. | 370/503 |
| 2007/0259677 | A1 * | 11/2007 | Waxman | 455/466 |

(Continued)

FOREIGN PATENT DOCUMENTS

| | | |
|---|---|---|
| JP | 6-6303 A | 1/1994 |
| JP | 2004-297591 A | 10/2004 |

(Continued)

*Primary Examiner* — Christopher M Brandt
(74) *Attorney, Agent, or Firm* — Birch, Stewart, Kolasch & Birch, LLP

(57) ABSTRACT

A method of controlling a dual mode mobile terminal, and which includes receiving, via a wireless communication unit of the mobile terminal, synchronous time information from a first communication network, the synchronous time information being used for a system time of the mobile terminal and for system time synchronization of the mobile terminal with the first communication network; receiving, via the wireless communication unit, asynchronous time information from a second communication network, the asynchronous time information not being used for system time synchronization of the mobile terminal with the second communication network; calculating, via the controller, an average of a calculated difference between the synchronous time information and the asynchronous time information; receiving, via the wireless communication unit, a message from the second communication network; and setting, via the controller, a reception time stamp of when the message is received based on time information contained in the message received from the second communication network and the calculated average difference.

14 Claims, 9 Drawing Sheets

U.S. PATENT DOCUMENTS

| | | | |
|---|---|---|---|
| 2009/0013330 A1* | 1/2009 | Gotz et al. | 719/313 |
| 2009/0092154 A1* | 4/2009 | Malik et al. | 370/480 |
| 2009/0232126 A1* | 9/2009 | Cordeiro et al. | 370/350 |
| 2009/0286564 A1* | 11/2009 | Ho | 455/502 |
| 2010/0067507 A1* | 3/2010 | Park | 370/338 |
| 2010/0165975 A1* | 7/2010 | Lerzer et al. | 370/350 |
| 2010/0323728 A1* | 12/2010 | Gould et al. | 455/466 |
| 2011/0151865 A1* | 6/2011 | Lau et al. | 455/433 |
| 2011/0176535 A1* | 7/2011 | Lipka et al. | 370/350 |
| 2011/0300859 A1 | 12/2011 | Takeda | |

FOREIGN PATENT DOCUMENTS

| | | |
|---|---|---|
| JP | 2011-259073 A | 12/2011 |
| WO | WO 2007/073465 A1 | 6/2007 |
| WO | WO 2009/114421 A2 | 9/2009 |

* cited by examiner

METHOD AND APPARATUS FOR RECEIVING SHORT MESSAGE SERVICE (SMS) IN DUAL MODE TERMINAL

This application claims the benefit and of priority U.S. Provisional Patent Application No. 61/367,458, filed on Jul. 26, 2010 and Korean Patent Application No. 10-2010-0106822, filed on Oct. 29, 2010, which are hereby incorporated by reference as if fully set forth herein.

BACKGROUND OF THE INVENTION

1. Field of the Invention

The present invention relates to a method and apparatus for receiving a short message service (SMS) in a dual mode terminal.

2. Discussion of the Related Art

Wireless mobile communication technology is being rapidly developed not only for voice communication but also for high-speed transmission/reception of data. Nowadays, a fourth generation mobile communication technology, for example, a Long Term Evolution (LTE) wireless communication system is a focus of attention. However, when a fourth generation communication network and a third generation communication network coexist, a mobile communication terminal or a mobile communication data card must include not only fourth generation mobile communication technology but also third generation mobile communication technology, which is still highly prevalent globally. Therefore, in order to simultaneously support next generation mobile communication technology and legacy mobile communication technology, a mobile communication terminal having a dual modem processor and a data-card type device (hereinafter referred to as a dual mode terminal) are needed.

The dual mode terminal (also known as a dual mode device) includes two modems for supporting different communication schemes. Generally, the dual mode terminals are used in a region including heterogeneous communication networks. A terminal that communicates with a Long Term Evolution (LTE) wireless communication network and a Code Divisional Multiple Access (CDMA) network is an example of a dual mode mobile terminal.

SUMMARY OF THE INVENTION

Accordingly, one object of the present invention is to address the above-noted and other problems.

Another object of the present invention is to provide an apparatus and method for receiving a short message service (SMS) in a dual mode terminal.

To achieve these objects and other advantages and in accordance with the purpose of the invention, as embodied and broadly described herein, the present invention provides a method of controlling a dual mode mobile terminal, and which includes receiving, via a wireless communication unit of the mobile terminal, synchronous time information from a first communication network, the synchronous time information being used for a system time of the mobile terminal and for system time synchronization of the mobile terminal with the first communication network; receiving, via the wireless communication unit, asynchronous time information from a second communication network, the asynchronous time information not being used for system time synchronization of the mobile terminal with the second communication network; calculating, via a controller of the mobile terminal, a difference between the synchronous time information and the asynchronous time information; calculating, via the controller, an average of the calculated difference between the synchronous time information and the asynchronous time information; storing, in a memory of the mobile terminal, the calculated average difference; receiving, via the wireless communication unit, a message from the second communication network; and setting, via the controller, a reception time stamp of when the message is received based on time information contained in the message received from the second communication network and the calculated average difference. The present invention also provides a corresponding dual mode mobile terminal.

In another aspect, the present invention provides a method of controlling a dual mode mobile terminal, and which includes receiving, via a wireless communication unit on the mobile terminal, a message from a Long Term Evolution (LTE) communication network in a specific region incapable of communicating with a Code Divisional Multiple Access (CDMA) communication network; acquiring, via a controller on the mobile terminal, time information contained in the message received from the LTE communication network; and adding, via the controller, a transmission expected time to the acquired time information to obtain a reception time stamp indicating a reception time of the message received from the LTE communication network. The present invention also provides a corresponding dual mode mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) refers to an arbitrary node of a network end which communicates with the above terminal, and may include a Node B (Node-B), an eNode B (eNode-B), and an access point (AP) and the like.

The Evolved Universal Mobile Telecommunications System (E-UMTS) and associated technical characteristics will now be described with reference to the accompanying drawings.

Figure 1:
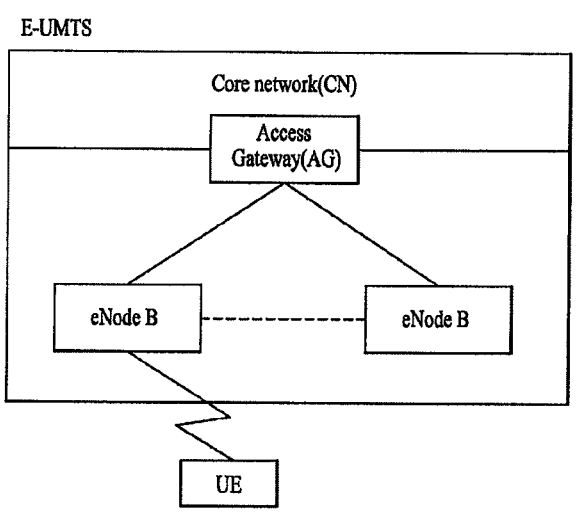
FIG. 1 is a conceptual diagram illustrating an Evolved Universal Mobile Telecommunications System (E-UMTS) network structure.

In particular, FIG. 1 is a conceptual diagram illustrating an Evolved Universal Mobile Telecommunications System (E-UMTS) network structure. In particular, the E-UMTS has evolved from a legacy WCDMA UMTS system, and basic standardization thereof is now being conducted by the 3rd Generation Partnership Project (3GPP). The E-UMTS system may also be referred to as a Long Term Evolution (LTE) system. For details of the technical specifications of the UMTS and E-UMTS systems, refer to Release 7 and Release 8 of "3rd Generation Partnership Project; Technical Specification Group Radio Access Network," which are hereby incorporated by reference.

As shown in FIG. 1, the E-UMTS system largely includes a User Equipment (UE), a base station (or eNB), and an Access Gateway (AG), which is located at an end of a network (E-UTRAN) and is connected to an external network. Generally, an eNB can simultaneously transmit multiple data streams for a broadcast service, a multicast service and/or a unicast service. An interface for transmission of user traffic or control traffic may be located between eNBs.

The AG may be divided into a part that handles processing of user traffic and a part that handles control traffic. Here, the AG part for processing new user traffic and the AG part for processing control traffic can communicate with each other using a new interface. The AG manages mobility of a UE on a Tracking Area (TA) basis. Further, the TA includes a plurality of cells, when the UE moves from a specific TA to another TA, the UE notifies the AG that the TA has changed.

In addition, a Core Network (CN) may include the AG and a network node or the like for user registration of the UE. An interface for discriminating between the E-UTRAN and the CN may also be used.

Figure 2:
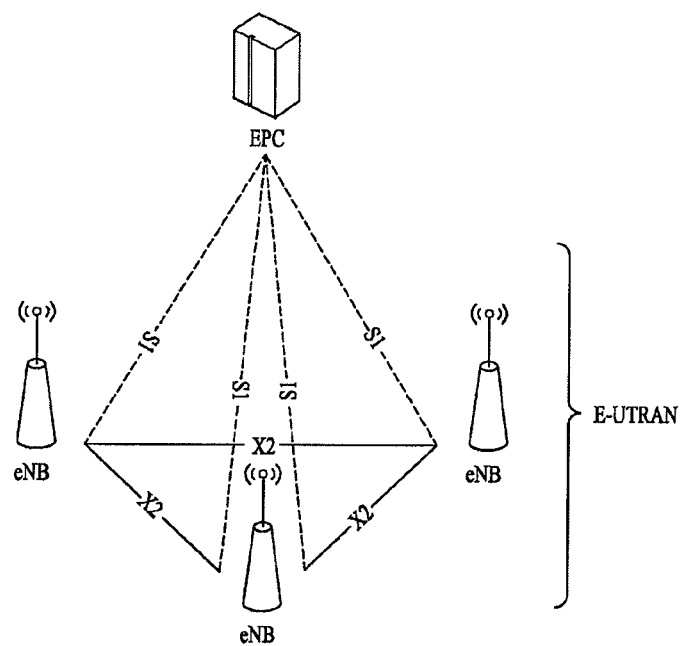
FIG. 2 is a conceptual diagram illustrating an E-UTRAN network structure.

Next, FIG. 2 illustrates a network structure of an Evolved Universal Terrestrial Radio Access Network (E-UTRAN) system, which is a mobile communication system to which the embodiment of the present invention is applied. In more detail, the E-UTRAN system is an evolved version of the conventional UTRAN system. Further, the E-UTRAN includes one or more cells that will also be referred to as "eNode B(s)" or "eNB(s)". The eNBs are connected through an X2 interface, and each eNB is connected to the User Equipment (UE) through a radio interface and is connected to an Evolved Packet Core (EPC) through an S1 interface.

The EPC may also include a Mobility Management Entity (MME), a Serving-Gateway (S-GW), and a Packet Data Network-Gateway (PDN-GW). The MME may include UE access information or UE capability information, and this information is generally adapted to manage UE mobility. Further, the S-GW is a gateway in which the E-UTRAN is located at an end point, and the PDN-GW is a gateway in which a Packet Data Network (PDN) is located at an end point.

Figure 3:
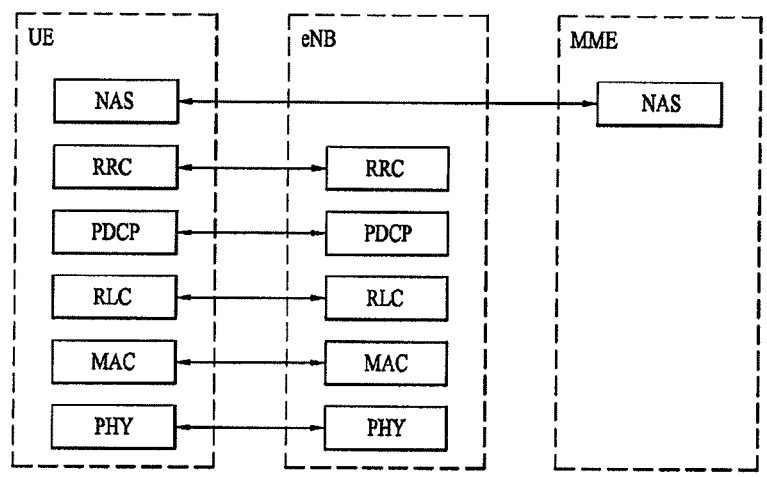
FIGS. 3 and 4 illustrate a control plane and a user plane (U-Plane) of a radio interface protocol between a User Equipment (UE) and an E-UTRAN according to the 3GPP wireless access network standard.
Figure 4:
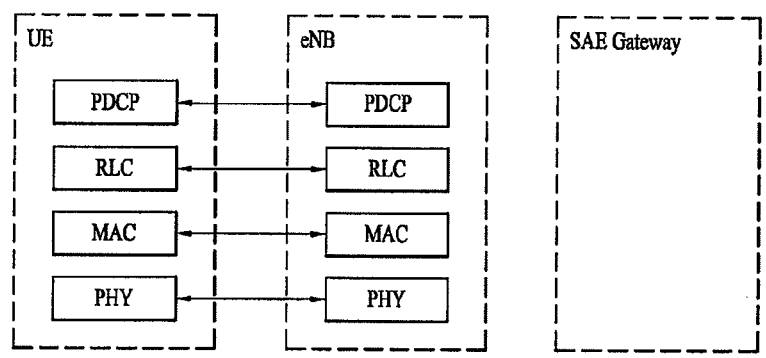

Next, FIGS. 3 and 4 illustrate a control plane and a user plane (U-Plane) of a radio interface protocol between a User Equipment (UE) and an E-UTRAN according to the 3GPP wireless access network standard. The radio interface protocol is divided vertically into a physical layer, a data link layer and a network layer, and horizontally into a user plane for data transmission and a control plane for signaling.

In addition, the protocol layers of FIGS. 3 and 4 can be divided into an L1 layer (first layer), an L2 layer (second layer) and an L3 layer (third layer) based on the lower three layers of the Open System Interconnection (OSI) reference model widely known in communication systems.

Further, the control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. In addition, data is transferred between the MAC layer and the physical layer through the transport channel. Data transfer between different physical layers, specifically between the respective physical layers of transmitting and receiving sides, is performed through the physical channel. The physical channel is also modulated according to the Orthogonal Frequency Division Multiplexing (OFDM) method, using time and frequencies as radio resources.

Further, the MAC layer of the second layer provides a service to a Radio Link Control (RLC) layer, located above the MAC layer, through a logical channel. The RLC layer of the second layer enables reliable data transmission. The functions of the RLC layer may also be implemented through internal functional blocks of the MAC layer. In this instance, the RLC layer need not exist. A Packet Data Convergence Protocol (PDCP) layer of the second layer also performs a header compression function to reduce unnecessary control information in order to efficiently transmit IP packets such as IPv4 or IPv6 packets in a radio interface with a relatively narrow bandwidth.

Further, a Radio Resource Control (RRC) layer located at the lowermost of the third layer is defined only in the control plane and is responsible for controlling logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages.

In FIG. 3, a Non-Access Stratum (NAS) layer located above the RRC layer performs functions such as session management and mobility management. The NAS layer exists in the Mobility Management Entity (MME) of the UE and network. In addition, the MME is a kernel control node of the LTE access network, and performs tracking and paging of a UE in an idle state. The MME also participates in a radio bearer activation/deactivation process.

Further, when either 'Initial Attach' or intra-LTE handover having core network relocation, the MME takes charge of a serving gateway (SGW) selection associated with the UE. The MME also performs UE authentication by interacting with a Home Subscriber Server (HSS). In addition, NAS signaling is ended at the MME, and the MME generates a temporary identifier and allocates this temporary identifier to the UE.

Also, the MME determines whether or not the UE has camp-on authority associated with a Public Land Mobile Network (PLMN) of a service provider. The MME is an end point for protecting the encryption/integrity for NAS signaling, and manages a security key. Further, the MME provides a control plane function for mobility between the LTE and the 2G/3G access network.

In order to manage UE mobility, an EPS Mobility Management-REGISTERED (EMM-REGISTERED) status and an EMM-DEREGISTERED status are defined in the NAS layer. The EMM-REGISTERED status and the EMM-DEREGISTERED state are applied to a Mobility Management Entity (MME). The user equipment (UE) is initially in the EMM-DEREGISTERED status, and performs an 'Initial Attach' procedure to access a network, such that it is registered in this network. If this 'Attach' procedure has been successfully performed, the UE and the MME enter the EMM-REGISTERED state.

In order to manage a signaling connection between the UE and the EPC, an EPS Connection Management (ECM)-IDLE status and an ECM-CONNECTED status are defined. The above-mentioned statuses are applied to the UE and the MME. Further, the UE in the ECM-IDLE state is in the ECM-CONNECTED state when it establishes an RRC connection with an E-UTRAN. If the MME of the ECM-IDLE state makes an S1 connection with the E-UTRAN, it enters the ECM-CONNECTED state. If the UE is in the ECM-IDLE state, the E-UTRAN has no context information of the UE.

Therefore, the UE of the ECM-IDLE state performs an UE-based mobility procedure (e.g., cell selection or cell reselection) without receiving a command from the network. Otherwise, if the UE is in the ECM-CONNECTED state, UE mobility is managed by the network. If the UE is in the ECM-IDLE state and the UE's location recognized by the network changes to another UE location, the UE performs a Tracking Area Update procedure, such that it informs the network of the UE's location.

Figure 5:
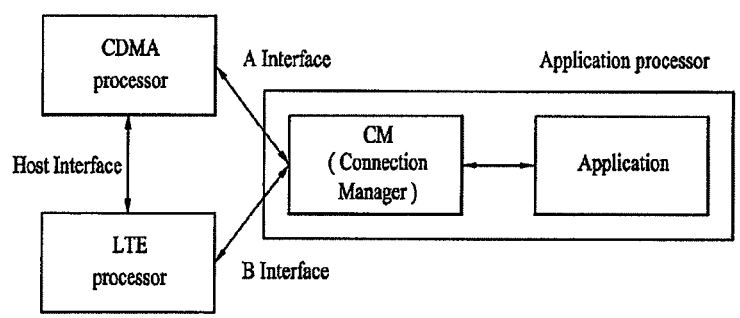
FIG. 5 is a block diagram illustrating a dual mode terminal according to an embodiment of the present invention.

Next, FIG. 5 is a block diagram illustrating a dual mode terminal according to an embodiment of the present invention. Referring to FIG. 5, the dual mode terminal includes an application processor, an LTE processor, and a CDMA processor for processing a signal received from a CDMA network.

Further, the application processor may be implemented as a hardware module in a dual mode terminal, or may be contained in a Personal Computer (PC) independent of a dual mode terminal. In addition, the application processor includes a connection manager (CM) that manages and controls a state of connection to the CDMA network or the LTE network according to a network environment.

In more detail, the CM performs switching for data communication between the application and one of two processors (i.e., CDMA processor and LTE processor) according to a network connection state. That is, if the dual mode terminal is connected to the CDMA network, application data is transmitted and received to and from the A interface so as to interconnect the CDMA processor and the application. If the dual mode terminal is connected to the LTE network, application data is transmitted and received to and from the B interface so as to interconnect the LTE processor and the application.

The host interface is located between the CDMA processor and the LTE processor, and may be used for transmission of control and data signals between individual processors.

Figure 6:
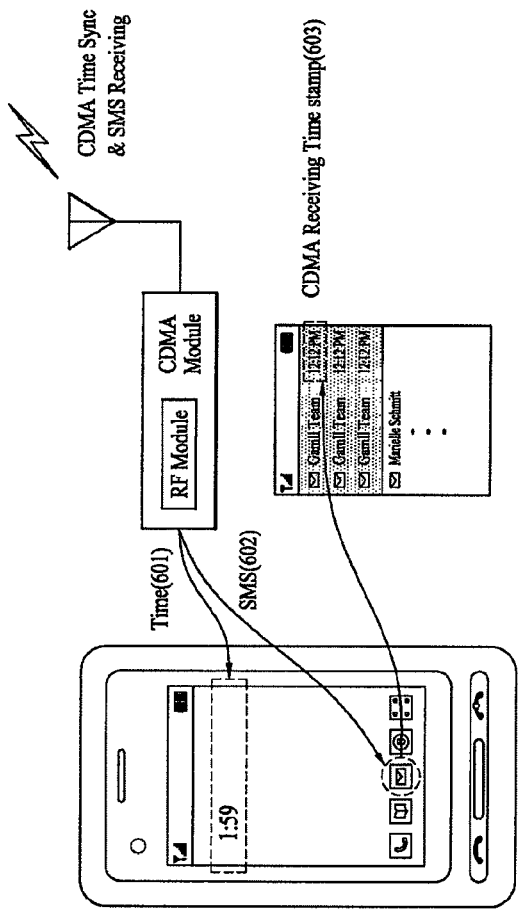
FIG. 6 is a conceptual diagram illustrating a method for receiving an SMS message by a related art terminal device capable of supporting only a CDMA communication network according to an embodiment of the present invention.

Next, FIG. 6 is a conceptual diagram illustrating a method for receiving an SMS by a related art terminal device capable of supporting only a CDMA communication network according to the present invention.

Referring to FIG. 6, the related art terminal device capable of supporting only signal transmission/reception with the CDMA communication network receives time information (also known as temporal information) from a synchronous CDMA communication network (Step 601). Thereafter, upon receiving an SMS from the CDMA communication network (Step S602), the related art terminal device displays a time (i.e., a timestamp) when the SMS was received based on the time synchronization acquired from the step 601, so that a user can recognize the timestamp information (step 603).

Figure 7:
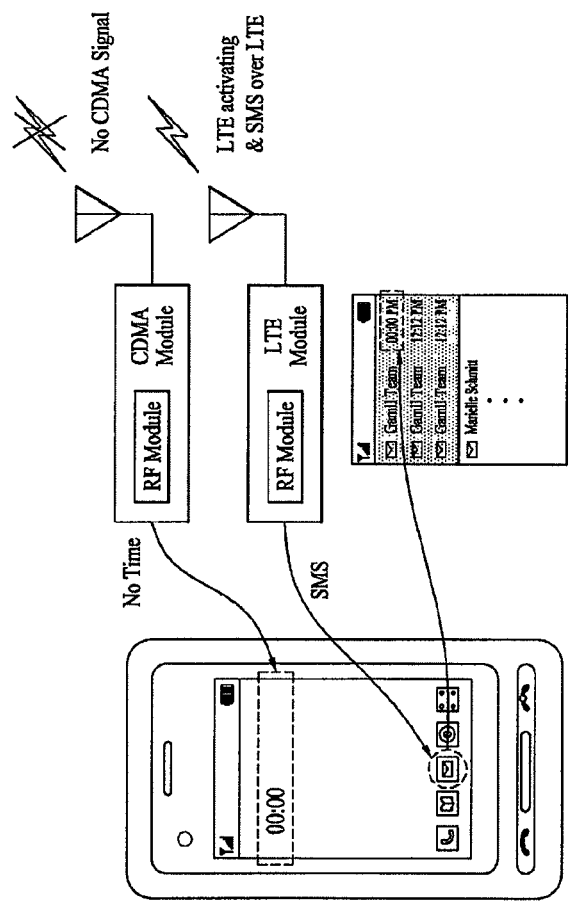
FIG. 7 shows the problems encountered in a general dual mode terminal device.

Further, FIG. 7 shows the problems encountered in a dual mode terminal device. Referring to FIG. 7, although the terminal is a dual mode terminal device, the dual mode terminal device acquires time synchronization for a phone time based on a synchronous CDMA communication network so as to establish a system time. Therefore, if the terminal device does not access the CDMA communication network during the initial driving of the terminal device, the system time of the terminal device does not acquire time synchronization.

In addition, if the dual mode terminal can not access the CDMA communication network, there is a high probability that the dual mode terminal is located in a region with only the LTE communication network and receives the SMS over the LTE communication network. Although the LTE communication network provides time information, this time information is different from other time information transmitted over the CDMA communication network. Also, because the LTE communication network uses an asynchronous scheme, a time (i.e., a timestamp) at which the dual mode terminal receives the SMS may be incorrect.

In order to solve the above-mentioned problems, the SMS reception method for use in the dual mode terminal device according to embodiments of the present invention will hereinafter be described with reference to the accompanying drawings.

Figure 8:
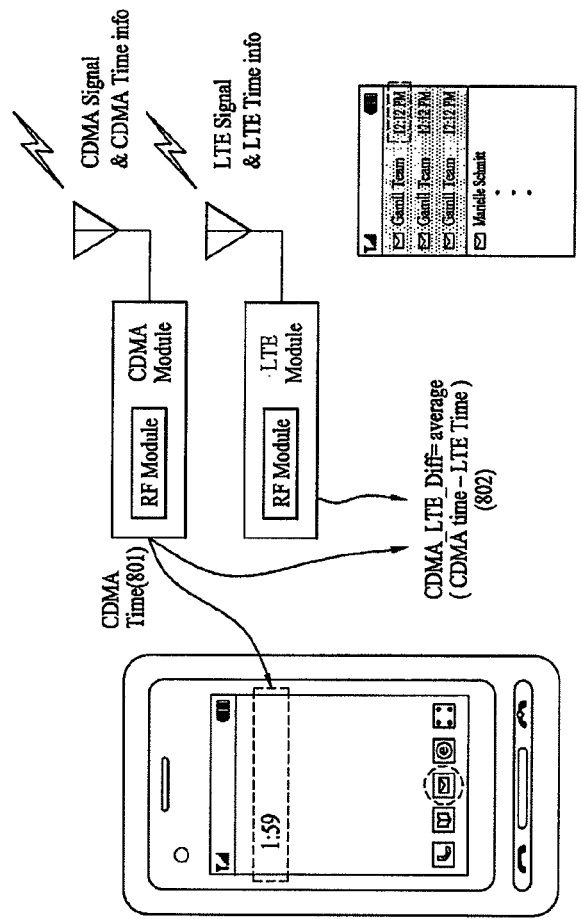
FIG. 8 is a conceptual diagram illustrating a method for receiving an SMS in a dual mode terminal device according to one embodiment of the present invention.

In addition, FIG. 8 is a conceptual diagram illustrating a method for receiving an SMS in a dual mode terminal device according to one embodiment of the present invention. In FIG. 8, the dual mode terminal device is assumed to be located in a region capable of communicating with both the CDMA communication network and the LTE communication network.

Referring to FIG. 8, the dual mode terminal device acquires time synchronization upon receiving time information from the synchronous CDMA communication network (Step 801). In addition, because the dual mode terminal device can also access the LTE communication network, the terminal device can also receive time information from the LTE communication network.

Thus, the dual mode terminal device calculates a difference between time information received from the LTE communication network and other time information received from the CDMA communication network (Step 802), and stores an average of the calculated difference as represented by the following equation 1.

$$CDMA\_LTE\_Diff = \text{average}(CDMA\ time - LTE\ Time) \quad \text{Equation 1}$$

Thus, in one embodiment, the terminal device calculates a plurality of values corresponding to a difference between the CDMA time and the LTE time. The terminal device then calculates an average of the calculated values.

Therefore, when the dual mode terminal according to an embodiment of the present invention receives the SMS from the LTE communication network under the condition that it does not access the CDMA communication network as shown in FIG. 7, the terminal device calculates a timestamp of the SMS received from the LTE communication network based on not only the time information received from the LTE communication network but also the aforementioned average difference value, and displays the calculated timestamp, as represented by the following equation 2.

$$\text{Stamp Time} = \text{LTE Time} + \text{CDMA\_LTE\_Diff} \qquad \text{Equation 2}$$

Figure 9:
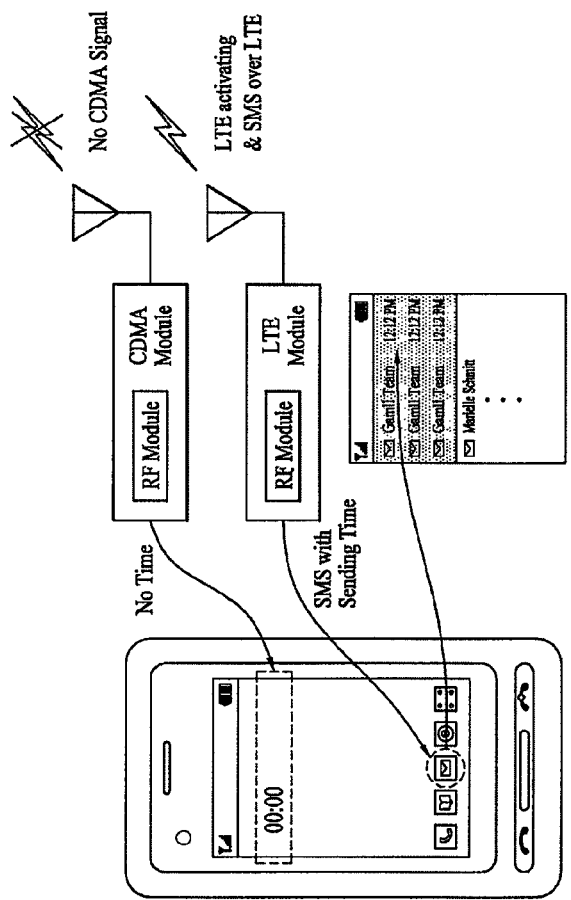
FIG. 9 is a conceptual diagram illustrating a method for receiving an SMS in a dual mode terminal device according to another embodiment of the present invention.

Next, FIG. 9 is a conceptual diagram illustrating a method for receiving an SMS in a dual mode terminal device according to another embodiment of the present invention. In FIG. 9, the dual mode terminal device is assumed to be located in a region capable of communicating with only the LTE communication network. Likewise, assuming that the dual mode terminal does not access the CDMA communication network during the initial driving operation, the system time of the terminal device is unable to acquire time synchronization.

Referring to FIG. 9, the SMS received from the LTE communication network may include information about a time at which a transmission end entity transmits the SMS. Thus, a transmission expectation time may be added to the above-mentioned transmission time so as to calculate a reception timestamp.

Further, the transmission expectation time may be predetermined by a manufacturing company of the terminal, and may also be set to a specific value that is statistically calculated using information of a base station (BS) and information of another BS to which the dual mode terminal serving as a reception end entity is connected.

That is, the finally calculated and displayed timestamp can be represented by the following equation 3.

$$\text{Stamp Time} = \text{SMS Sending Time} + \text{Transmission Duration} \qquad \text{Equation 3}$$

Expectation Time

Meanwhile, a timestamp value calculated by Equation 2 or Equation 3 may be calculated as a time located prior to a timestamp of the latest received SMS. In this instance, the dual mode terminal may determine the presence of a timestamp error, and replace the timestamp of the latest received SMS with a timestamp of the received SMS.

Figure 10:
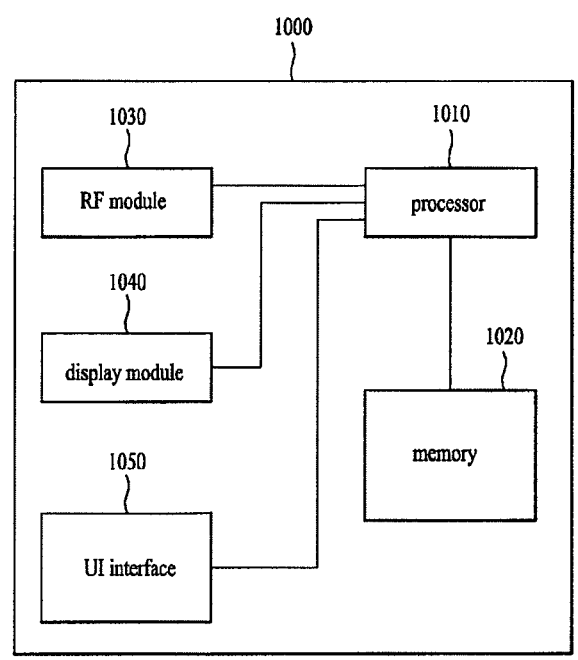
FIG. 10 is a block diagram illustrating a terminal device according to one embodiment of the present invention.

Next, FIG. 10 is a block diagram illustrating a terminal device 1000 according to an embodiment of the present invention. As shown, the terminal device 1000 includes a processor 1010, a memory 1020, a Radio Frequency (RF) module, a display module 1040, and a user interface (UI) module 1050. Further, some modules may be omitted or additional modules may be added as necessary. Further, the processor 1010 includes an LTE processor for communicating with the LTE network and a CDMA processor for communicating with the CDMA network separately from each other, and generally performs the operations of the embodiments of the present invention.

In addition, the memory 1020 is connected to the processor 1010, and stores an operating system, an application, a program code, data and the like. The RF module is connected to the processor 1010, converts a baseband signal into a radio frequency (RF) signal, or converts the RF signal into the baseband signal.

For these operations, the RF module 1030 performs analog conversion, amplification, filtering, and frequency up-conversion in order or performs such operations in reverse order. The display module 1040 is also connected to the processor 1010 and displays various information. Further, the display module 1040 may be a Liquid Crystal Display (LCD), a Light Emitting Diode (LED), an Organic Light Emitting Diode (OLED) and the like.

In addition, the user interface (UI) module 1050 is connected to the processor 1010, and may be implemented as a combination of user interfaces such as a keypad, a touch-screen, etc.

In addition, the above message refers to an SMS message, but the message may also be a multimedia message such as an MMS message.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

Although the present invention describes a multi-mode device that is capable of communicating with the LTE network and the CDMA network, the scope or spirit of the present invention is not limited thereto and can be applied to other wireless communication schemes as necessary.

The embodiments of the present invention may also be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a dual mode mobile terminal, the method comprising:
   receiving, via a wireless communication unit of the mobile terminal, synchronous time information from a first communication network, said synchronous time information being used for a system time of the mobile terminal and for system time synchronization of the mobile terminal with the first communication network;
   receiving, via the wireless communication unit, asynchronous time information from a second communication network, said asynchronous time information not being used for system time synchronization of the mobile terminal with the second communication network;
   calculating, via a controller of the mobile terminal, a difference between the synchronous time information and the asynchronous time information;
   calculating, via the controller, an average of the calculated difference between the synchronous time information and the asynchronous time information;
   storing, in a memory of the mobile terminal, the calculated average difference;
   receiving, via the wireless communication unit, a message from the second communication network; and
   setting, via the controller, a reception time stamp of when the message is received based on time information contained in the message received from the second communication network and the calculated average difference.

2. The method of claim 1, wherein the first communication network is a Code Divisional Multiple Access (CDMA) communication network, and the second communication network is a Long Term Evolution (LTE) communication network.

3. The method of claim 2, wherein the mobile terminal is unable to communicate with the CDMA communication network when the message is received from the LTE communication network.

4. The method of claim 2, further comprising:
   if the time information of the message received from the LTE communication network is a time earlier than time information of a latest received message, setting the received time information of the message received from the LTE communication network to the time information of the latest received message.

5. The method of claim 1, wherein the message is a short message service (SMS) message.

6. The method of claim 2, wherein the calculating the average of the difference between the synchronous time information and the asynchronous time information is based on the following equation:

CDMA_LTE_$Diff$=average(CDMA time−LTE Time), and wherein the CDMA time corresponds to the synchronous time information and the LTE Time corresponds to the asynchronous time information.

7. The method of claim 6, wherein the setting the received time information of when the message is received is based on the following equation:

Stamp Time=LTE Time+CDMA_LTE_$Diff$, and wherein the Stamp time corresponds to the set received time information of when the message is received from the second communication network.

8. A dual mode mobile terminal, comprising:
   a wireless communication unit configured to receive synchronous time information from a first communication network, said synchronous time information being used for a system time of the mobile terminal and for system time synchronization of the mobile terminal with the first communication network, and to receive asynchronous time information from a second communication network, said asynchronous time information not being used for system time synchronization of the mobile terminal with the second communication network;
   a controller configured to calculate a difference between the synchronous time information and the asynchronous time information, and to calculate an average of the calculated difference between the synchronous time information and the asynchronous time information;
   a memory configured to store the calculated average difference;
   said wireless communication unit further configured to receive a message from the second communication network;
   said controller further configured to set a reception time stamp of when the message is received based on time information contained in the message received from the second communication network and the calculated average difference; and
   a display configured to display at least a portion of the received message and the set reception time stamp.

9. The dual mode mobile terminal of claim 8, wherein the first communication network is a Code Divisional Multiple Access (CDMA) communication network, and the second communication network is a Long Term Evolution (LTE) communication network.

10. The dual mode mobile terminal of claim 9, wherein the mobile terminal is unable to communicate with the CDMA communication network when the message is received from the LTE communication network.

11. The dual mode mobile terminal of claim 9, wherein the controller is further configured to set the received time information of the message received from the LTE communication network to the time information of the latest received message, if the time information of the message received from the LTE communication network is a time earlier than time information of a latest received message.

12. The dual mode mobile terminal of claim 8, wherein the message is a short message service (SMS) message.

13. The dual mode mobile terminal of claim 9, wherein the controller is further configured to calculate the average of the difference between the synchronous time information and the asynchronous time information based on the following equation:

CDMA_LTE_$Diff$=average(CDMA time−LTE Time), and wherein the CDMA time corresponds to the synchronous time information and the LTE Time corresponds to the asynchronous time information.

14. The dual mode mobile terminal of claim 13, wherein the controller is further configured to set the received time information of when the message is received based on the following equation:

Stamp Time=LTE Time+CDMA_LTE_$Diff$, and wherein the Stamp time corresponds to the set received time information of when the message is received from the second communication network.

* * * * *